United States Patent [19]

Parish et al.

[11] 3,859,287
[45] Jan. 7, 1975

[54] THIOPTERIDINES AND PROCESS FOR PRODUCING SAME

[76] Inventors: Walter Wesley Parish, 1368 Locust Ln., Provo, Utah 84601; H. Smith Broadbent, 618 Hard Rd., Webster, N.Y. 14580

[22] Filed: May 5, 1971

[21] Appl. No.: 140,536

[52] U.S. Cl.......... 260/251.5, 106/288 R, 117/33.3, 252/300, 252/301.2 C, 260/247.2 A, 260/256.4 V, 260/294.9, 260/297 R
[51] Int. Cl............................................ C07d 57/12
[58] Field of Search................................ 260/251.5

[56] References Cited
UNITED STATES PATENTS

| | | | |
|---|---|---|---|
| 3,182,062 | 5/1965 | Pachter et al. | 260/251.5 |
| 3,239,527 | 3/1966 | Schmidt et al. | 260/251.5 |
| 3,274,191 | 9/1966 | Cragoe et al. | 260/251.5 |
| 3,361,748 | 2/1968 | Cragoe et al. | 260/251.5 |
| 3,557,105 | 1/1971 | Roch | 260/251.5 |

*Primary Examiner*—Donald G. Daus
*Assistant Examiner*—Anne Marie T. Tighe
*Attorney, Agent, or Firm*—Trask & Britt

[57] ABSTRACT

Novel 6-thio-substituted pteridine and related compounds of the pteridine family described by the following formula have been produced directly from reaction of substituted 5-nitrosopyrimidines and pyridinium salts in the presence of a thiol.

The novel 6-thio substituted compounds of the pteridine family may be represented by the general formula

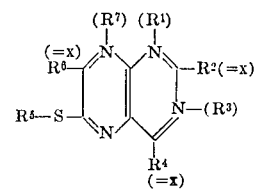

where $R^2$, $R^4$ and $R^6$ are amino, alkyl amino, arylamino, acetamido, hydroxy alkoxy, aryloxy, thio, alkylthio, arylthio, alkyl, aryl or hydrogen. When $R^2$, $R^4$ or $R^6$ are chalcogens, i.e., hydroxy or thio ($x = =O$ or $=S$) then $R^1$, $R^3$ and $R^7$ may be hydrogen, alkyl or aryl. $R^5$ may be an organic or inorganic group although preferably an organic group, especially alkyl and aryl groups included substituted alkyl and aryl groups. Inorganic groups include metals such as alkali and alkaline earths metals. The alkyl and aryl groups are perferably lower alkyl and single-ring aryl groups, especially alkyl groups of less than 6 carbon atoms and substituted phenyl groups wherein the substituent on the phenyl group is a lower alkyl group or a halogen radical.

16 Claims, 8 Drawing Figures

THIOPTERIDINES AND PROCESS FOR PRODUCING SAME

BACKGROUND OF INVENTION

Interest in 6-thiosubstituted pteridines has been present in the chemical arts since at least about 1964 when Belgian Pat. No. 639,386 issued to E. J. Cragoe describing the preparation of 6-benzylthio-4-pteridinone and J. Clark described in J. Chem. Society (1964) 4920-2925, the preparation of 6-benzylthiopteridine. Subsequently, U.S. Pat. Nos. 3,305,552, 3,313,813, 3,360,517, 3,361,748 issued describing various 6-thiosubstituted pteridinones.

DESCRIPTION OF INVENTION

Novel 6-thiosubstituted pteridine and related compounds have been produced by reaction in the presence of a thiol of a 2,4-substituted-6-acetamido-5-nitrosopyrimidine or a 2,4-substituted-6-amino-5-nitrosopyrimidine and a quaternary pyridinium salt having a relative methylene group, and by subsequent hydrolysis of the products of such reaction.

The novel 6-thio substituted compounds of the pteridine family may be represented by the general formula wherein $R^2$, $R^4$ and $R^6$ are amino, alkyl amino, arylamino, acetamido, hydroxy, alkoxy, aryloxy, thio, alkylthio, arylthio, alkyl, aryl or hydrogen. When $R^2$, $R^4$ or $R^6$ are chalcogens, i.e., hydroxy or thio ($x = =O$ or $=S$) then $R^1$, $R^3$ and $R^7$ may be hydrogen, alkyl or aryl. $R^5$ may be an organic or inorganic group although preferably an organic group, especially alkyl and aryl groups included substituted alkyl and aryl groups. Inorganic groups include metals such as alakali and alkaline earth metals. The alkyl and aryl groups are preferably lower alkyl and single-ring aryl (monoaryl) groups, especially alkyl groups of less than 6 carbon atoms and substituted phenyl groups wherein the substitutent on the phenyl group is a lower alkyl group or a halogen radical. $R^5$ is preferably an aryl or alkyl group of less than about 10 carbon atoms, including substituted alkyl and aryl groups. The alkyl and aryl groups mentioned in regard to substituents for $R^2$, $R^4$ and $R^6$ have preferably less than 10 carbon atoms. Also, it is preferred that at least two of the groups set forth for $R^2$, $R^4$ and $R^6$ be other than hydroxy, alkoxy, aryloxy, thio, alkylthio, arylthio, alkyl, aryl or hydrogen.

The novel process comprises reacting (A) a thiol, preferably an alkyl or aryl thiol, especially one having less than about 10 carbon atoms, (B) a 2,4-substituted-6-acetamido-5-nitrosopyrimidine or a 2,4-substituted-6-amino-5-nitrosopyrimidine, preferably a 2-substituted-4, 6-diacetamido-5-nitrosopyrimidine wherein the substituted group is an amine or acetamido group, including substituted amino and acetamido groups, and (C) a quaternary pyridinium salt, especially a halide salt, having a reactive methylene group next to the functional group, including quaternary salts such as 1-(cyanomethyl)pyridinium halides and acylpyridinium halides, for example, phenacyl pyridinium bromide.

The process can be represented structurally as follows:

$R''$ and $R'''$ are amine or acetamido groups and R has the significance set forth hereinabove for $R^5$. Although 1-(cynamomethyl) pyridinium chloride is illustrated in the above reaction, any of the contemplated quaternary pyridium salts having an active methylene group could be utilized.

Whenever the reaction product in (II) has an acetamido group as $R'''$ it may be converted to an amino group by hydrolysis. The hydrolysis reaction is useful in obtaining 2,4,7-amino substituted 6-thiopteridines. Hydrolysis is conducted under either acid or basic conditions at ambient or elevated temperatures in an aqueous medium.

The use of an acylpyridinium salt provides products having various 7-substituted groups on the pteridine ring or an absence of substitution at that site. For example, substitution of an acylpyridinium compound having the formula produces compounds defined by formula (I) wherein $R''''$ has the same significance as $R^6$ set forth hereinabove except that $R''''$ doesn't include chalcogen, but additionally includes alkoxy groups. The reaction of 1-(carbethoxymethyl) pyridinium chloride with a nitrosopyrimidine to yield a pteridinone is set forth below in Example XXI.

The process described herein provides reaction products at high yields which are readily obtainable by filtration, centrifugation, or other solid-liquid physical separation techniques. The yields are generally about 40% to 90% overall.

The process is preferably conducted in the presence of a suitable solvent since the reactants other than the thiol, are generally solid. Solvents especially useful in which the reactants are soluble but in which the reaction product is insoluble. Preferred solvents of this type are members of the alcohol family, including polyols and hydroxy terminated polyethers. Exemplary alcohols include ethanol, propanol, butanol, ethylene glycol, diethylene glycol, propylene glycol, and the like.

Other solvent families useful in this invention include ketones, non-polar organic solvents, strong solvents such as dimethylformamide, dimethylsufloxide and hexamethyl phosphoric acid triamide or hexamethyl phosphoramide. If one of the latter three mentioned solvents is utilized it is necessary to recover the reaction product by distillation, extraction or related techniques for recovering a soluble product inasmuch as the reaction products are soluble in such solvents. Also, use of ketones such as acetones, methylethyl ketone and the like may reduce yields slightly since such solvents may participate in the main reaction or in competing reactions.

The reaction is generally conducted at a temperature sufficient to cause refluxing of the solvent. In this manner a constant elevated temperature may be maintained. The reaction proceeds more readily at temperatures above room temperature, i.e., about 25° C, although temperatures sufficiently high to cause product degradation should be avoided. Reaction temperatures in the range from about 35°C to about 100°C are effective for promoting rapid reaction.

Alkali hydroxides, alkoxides, or alkali salts of weak acids, especially weak organic acids are preferably included in the reaction mixture in stoichiometric quantities, i.e., equamolar amounts based upon the pyridinium salt present. Excess quantities of the alkali compound may be present without a noticeable effect, however, a deficiency detrimentally affects reaction rate. Typical alkali metal salts include potassium acetate, sodium acetate, sodium propionate, potassium butyrate, and the like. Typical hydroxides include sodium hydroxide, potassium hydroxide and the like, while alkoxides such as sodium methoxide, sodium ethoxide, thallous ethoxide and the like are useful in promoting the reaction, especially between reactants which react with difficulty.

The reactants may be present in varying proportions, however, an optimum proportion comprises about two moles of thiol, about two moles of pyridinium salt and two moles of base present for each mole of nitrosopyrimidine. Although the reaction theoretically involves equimolar quantities of each reactant it has been found desirable to provide an excess of thiol pyridinium salt and base.

Typical thiols useful in this invention include thiophenol, 1-phenylethanethiol, methanethiol, ethanethiol, 4-toluenethiol, 3-toluenethiol, 2-toluenethiol, 4-chlorobenzenethiol, 4-carboxybenzenethiol, 2-aminobenzenethiol, 4-acetamidobenzenethiol, 4-butylbenzenethiol, phenylmethanethiol, 2-phenylethanethiol, 2-propanethiol, n-hexanethiol, 1-adamantanethiol, 2,3-dihydroxy-1-propanethiol, 2-dithiobenzene and the like. Preferred thiols are thiols having alkyl and aryl groups attached including substituted groups such as hydroxy, halo and other nonreactive groups or radicals, particularly wherein said aryl or alkyl group has less than about 10 carbon atoms. Thiols of larger molecular size are useful in the reaction, however, because of steric relationships and lack of mobility of the larger thiols, the reaction rate and yield may be reduced.

Typical pyridinium salts useful in this invention include 1-(cyanomethyl)pyridinium chloride, phenacylpyridinium bromide, acetonylpyridinium bromide, 1-(3,3-diethyl-2-oxo-1-butyl)pyridinium bromide, 1-(carbethoxymethyl)pyridinium chloride, ethacylpyridinium chloride, parachlorophenacylpyridinium bromide, hydroxyethacylpyridinium chloride, and the like. Other pyridinium compounds such as pyridinium activated acids, amides and esters in addition to the aldehydes, ketones and nitriles may be utilized. The pyridinium compounds useful in this invention have a reactive methylene group adjacent to the functional group.

Typical 5-nitrosopyrimidines useful as reactants in this invention include 2-amino-4,6-diacetamido-5-nitrosopyrimidine, 2-dimethylamino-4,6-diacetamido-5-nitrosopyrimidine, 2,4,6-triacetamido-5-nitrosopyrimidine, 2,6-diethylamino-4-acetamido-5-nitrosopyrimidine, 2-phenyl-4, 6-diacetamido-5-nitrosopyrimidine, 2-morpholino-4,6-diacetamido-5-nitrosopyrimidine, 2-piperidino-4,6-diacetamido-5-nitrosopyrimidine and the like.

Preferred substituent groups attached to the amino or acetamido group in the 2,4 and 6 position of nitrosopyrimidine reactants are alkyl or aryl groups of less than about 8 carbon atoms. Also, 5-nitrosopyrimidines which have no acetamido substituents are useful, especially when more vigorous reaction conditions are utilized. Typical amino-5-nitrosopyrimidines include 1,3-dimethyl-6-amino-5-nitrosouracil, 2-phenyl-4,6-diamino-5-nitrosopyrimidine 2-methyl-4,6-diamino-5-nitrosopyrimidine, 2-methyl thio-4,6-diamino-5-nitrosopyrimidine.

Typical novel pteridine compounds produced by the process of this invention include 4-acetamido-2-diethylamino-7-amino-6-phenylthiopterdine 4-acetamido-2, 7-phenylamino-6-(3-chlorophenyl thio)pteridine 2,4,7-trimethylamino-6-propylthiopteridine 4,7-dibutylamino-4-ethylamino-6-methylthiopteridine 2-ethyl-4,7-diamino-6-benzylthiopteridine 4-acetamido-2,7-diphenyl-6-(3-tolythio) pteridine 7-amino-2,4-diethyl-6-thiopteridine sodium salt 2,4-diacetamido-7-phenyl-6-hexylthiopterdine 4,7-diamino-6-phenylthiopteridine 4,7-diamino-1-methyl-6-phenylthio-2(1H) pteridinone The above compounds illustrate a few of the novel compounds falling within the genus set forth hereinabove. These compounds are produced by the reactions illustrated hereinbelow, including hydrolysis of acetamido compounds.

Identification of compounds of this invention by infrared techniques was useful inasmuch as the peaks and curves are known for the pteridine ring, the substituted thio group, and the various amino and acetamido groups.

The attached figures represent infrared curves for the following compounds.

The following examples illustrate two general techniques for preparing novel compounds of this invention. Examples I through IV illustrate the attempted reaction of a diacetamido nitrosopyrimidine and an organothioacetonitrile in the presence of an alkali metal compound. This technique does not always produce a reaction and, when successful, produces desired compounds in low yields. This technique is useful, however, since the reaction theoretically proceeds in a straightforward manner, products of this reaction can be compared with products from the novel process (illustrated in Example V et seq) to confirm identification.

The technique illustrated in Example I through IV has been designated as Methods A, B, C and D. Methods C and D successfully yielded compounds of the invention. The preferred processing technique set forth in Examples V et seq has been designated as Methods E, F, G and H.

The following table illustrates schematically the manner in which Methods C and D and Methods E, F, G and H are believed to have proceeded.

Table I

Methods illustrated in the examples in preparation of 2,4,7-triamino-6-pteridine.

R has the significance set forth hereinabove. Temperatures set forth herein refer to the centigrade scale unless indicated otherwise.

Example I

Attempted preparation of 2,4,7-triamino-6-phenylthiopteridine, method A.

A solution of 0.098 grams (1.00 mmoles) of potassium acetate in 2 ml of hot absolsute ethanol was added to a stirred mixture of 0.119 grams (0.500 mmoles) of 2-amino-4, 6-diacetamido-5-nitrosopyrimidine and 0.149 grams (1.00 mmoles) of phenylthioacetonitrile in 10 ml of refluxing absolute ethanol. After refluxing 3 hours, the mixture was still blue-green in color, indicating unreacted starting material. Paper chromatography of the mixture in solvent systems (A) 90% formic acid-water (1:4), (B) pyridine-water (1:4) and (D) Trifluoroacetic acid-water (1:4) indicated that no significant reaction had taken place and the experiment was discontinued.

Example II

Attempted preparation of 2,4,7-triamino-6-phenylthiopteridine, Method B.

The procedure was the same as in Method A except that 0.049 grams (1.0 mmoles) of sodium cyanide dissolved in 1 ml of water was used as the condensing base. Addition of the base, however, caused an immediate color change from blue to red-violet. After refluxing for 5 minutes, a pink solid began to separate from the mixture and reflux was discontinued. Paper chromatrography of the mixture in solvent systems A, B, and D, showed no fluorescent spots. Thin-layer chromatrography indicated that unreacted phenylthioacetonitrile was present in the mixture. The mixture was evaporated to dryness under reduced pressure, the pink residue treated with water, and the mixture was filtered. When dry, the pink solid weighed 0.0704 grams which would represent a 91.5% recovery of hdyrolyzed starting material. The IR spectrum, however, was not the same as an IR spectrum of the product of Example IV.

EXAMPLE III

Preparation of 4-acetamido-2,7-diamino-6-phenylthiopteridine, Method C.

A mixture of 0.119 grams (0.500 mmoles) of 2-amino-4,6-diacetamido-5-nitrosopyrimidine, 0.149 grams (1.00 mmoles) of phenylthioacetonitrile, and 0.0820 grams (1.00 mmoles) of sodium acetate in 10 ml of N,N-dimethylformamide was stirred at room temperature for 20 minutes heated at reflux for 5 minutes and cooled. The solvent was removed under reduced pressure, the residue was treated first with ether then with water and finally acetone. After drying, the product weighed 0.0330 grams (20.2%) and was identified as 4-acetamido-2,7-diamino-6-phenyl-thiopteridine. This material was identical to the same product prepared by the novel process herein described.

Example IV

Preparation of 2,4,7-triamino-6-phenylthiopteridine, Method D.

A mixture of 0.119 grams (0.500 moles) of 2-amino-4,6-diacetamido-5-nitrosopyrimidine, 0.149 grams (1.00 mmoles) of phenylthioacetonitrile, and 0.0540 grams (1.00 mmoles) of sodium methoxide, in ten ml of dimethylsulfoxide was stirred at room temperature for 1 hour. One gram of sodium hydroxide and 20 ml of water were added to the mixture. The mixture was swirled until the sodium hydroxide dissolved then allowed to stand for several hours. The mixture was brought to pH 6 by addition of acetic acid, cooled in ice, and filtered. After drying, the yellow solid weighed 0.0830 grams (68.4% yield) and was identified as 2,4,7-triamino-6-phenylthiopteridine. This material was identical to the same compound produced by the novel process described in Example VI.

Example V

Preparation of 4-acetamido-2,7-diamino-6-phenylthiopteridine, Method E.

Figure 1:
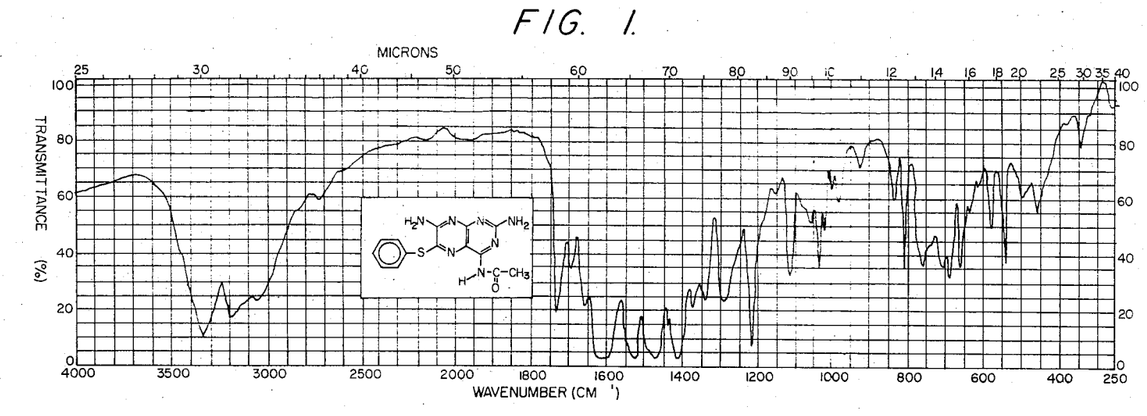
FIG. 1 is for 4-acetamido-2,7-diamino-6-phenylthiopteridine.

A solution of 0.0981 grams (1.00 mmoles) of potassium acetate in five ml of hot absolute ethanol was added to a stirred mixture of 0.119 grams (0.500 mmoles) of 2-amino-4,6-diacetamido-5-nitrosopyrimidine, 0,155 grams (1.00 mmoles) of 1-(cyanomethyl) pyridinium chloride, and 2,220 grams (2.00 mmoles) of thiophenol in 15 ml of refluxing absolute ethanol. The mixture was stirred and refluxed for ten minutes, then cooled in ice, filtered, and the yellow solid dried in an oven at 70°C to give 0.0940 grams (51.5% yield) of product, melting at 254°–255°C with decomposition. The material was identified as 4-acetamido-2,7-diamino-6-phenylthiopteridine by comparison with the authentic sample produced by the process set forth in Example III. See IR Curve in FIG. 1.

EXAMPLE VI

Preparation of 2,4,7-triamino-6-phenylthiopteridine, Method F.

Figure 2:
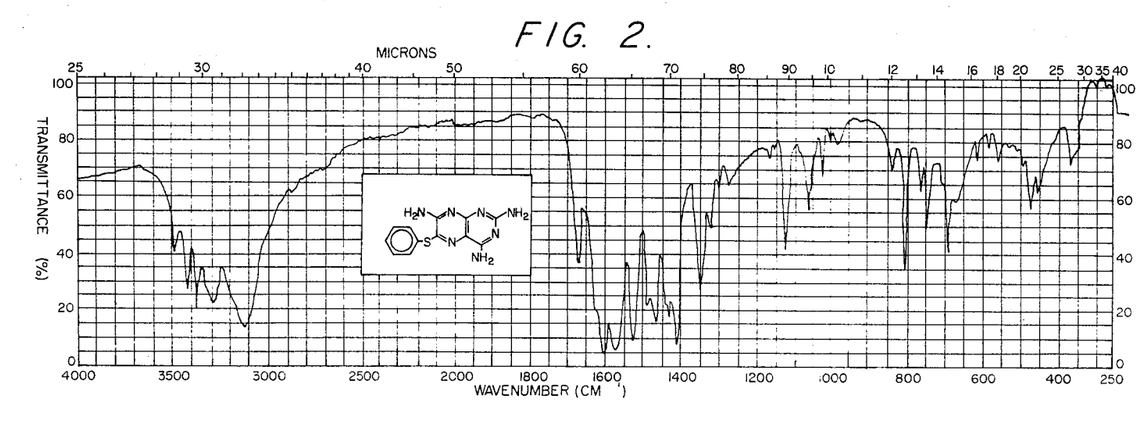
FIG. 2 is for 2,4,7-triamino-6-phenylthiopteridine.

A mixture of 0.220 grams (2.00 mmoles) of thiophenol and 0.0715 grams (1.79 mmoles) of sodium hydroxide dissolved in 10 ml of ethanol plus 1 ml of water was added to a stirred mixture of 0.119 grams (0.500 mmoles) of 2-amino-4,6-diacetamido-5-nitrosopyrimidine and 0.155 grams (1.00 mmoles) of 1-(cyanomethyl) pyridinium chloride in ten ml of refluxing ethanol. The mixture was refluxed for twelve hours, cooled in ice, filtered, and the solid dried in an oven at 70°C to give 0.100 grams (70.5% yield) of yellow product, melting above 301°C. The material was identified as 2,4,7-triamino-6-phenylthiopteridine by comparison with the authentic sample prepared by the process set forth in Example IV. See IR Curve in FIG. 2.

EXAMPLE VII

Preparation of 4-acetamido-2-amino-6-phenylthiopteridine, Method G.

A solution of 0.128 grams (1.16 mmoles) of thiophenol in twenty ml of absolute ethanol was added to a dry mixture of 0.121 grams (0.509 mmoles of 2-amino-4,6-diacetamido-5-nitrosopyrimidine, 0,156 grams (1.01 mmoles) of 1-(cyano-methyl) pyridinium chloride, and 0.0975 grams (0.994 mmoles) of potassium acetate. The mixture was immediately heated to reflux on a preheated hot plate, then refluxed with stirring for 5 minutes. The mixture was cooled to room temperature then cooled in ice for 3 hours and filtered. The solid product was washed with 10 ml of absolute ethanol in small portions, then 10 ml of water followed by another 5 ml of absolute ethanol. The solid was dried in an oven at 65° overnight to give 0.166 grams (71.7% yield) of 4-acetamido-2,7-diamino-6-phenyl-thiopteridine, melting at 245° with decomposition. The analytical sample was recrystallixed from butanol (Norit treatment followed by filtration through a Celite pad) with 46.2% recovery.

Anal. Calcd for $C_{14}H_{13}ON_7S$: C, 51,36; H, 4.00; N, 29.95. Found: C, 51.11; H, 3.97; N, 29.91.

Example VIII

Preparation of 4-acetamido-2,7-diamino-6(1-phenylethylthio)-pteridine, Method H.

Figure 4:
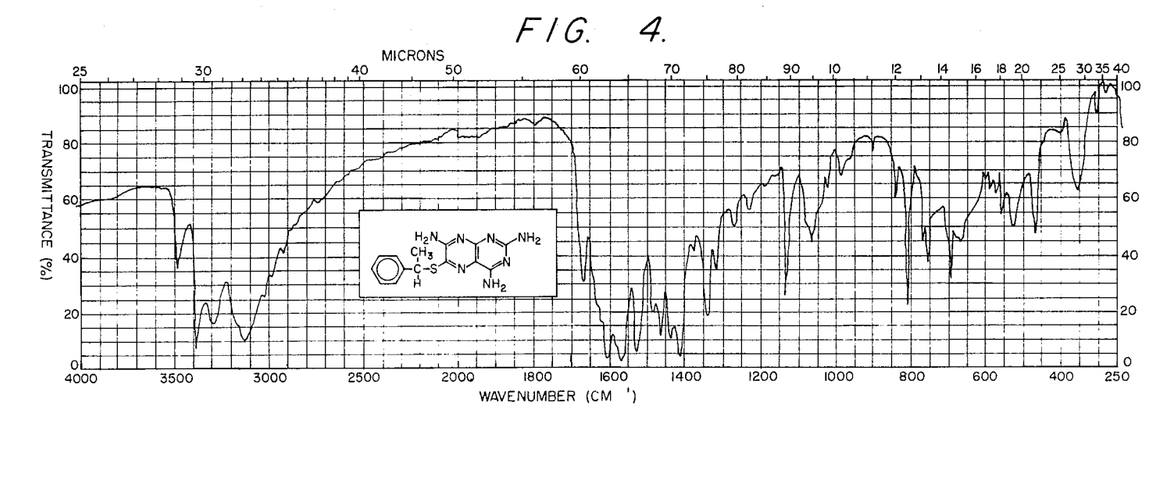
FIG. 4 is for 4-acetamido-2,7-diamino-6-(1-phenylethylthio)pteridine.

A solution of 0.309 grams (2.24 mmoles) of 1-phenylethanethiol in 20 ml of absolute ethanol was added to a dry mixture of 0.126 grams (0.536 mmoles) of 2-amino-4,6-diacetamido-5-nitrosopyridine, 0.158 grams (1.02 mmoles) of 1-(cyanomethyl) pyridinium chloride, and 0.109 grams (1.18 mmoles) of potassium acetate. The mixture was immediately heated to reflux on a pre-heated hot plate then refluxed with stirring for 30 minutes. The mixture was cooled, filtered to remove salt, and the filtrate evaporated to dryness under reduced pressure. The residue was extracted with ether, then ten ml of alcohol were added, followed by 20 ml of water. The mixture was then heated until all the solids dissolved, then cooled in ice overnight, and filtered. The solid was washed with water and dried in an oven at 70° to give 0.0980 grams (51.6% yield) of gold colored product. See IR Curve in FIG. 4.

Example IX

Hydrolysis of 4-acetamido-2,7-diamino-6-phenylthiopteridine, Method A.

4-Acetamido-2-amino-6-phenylthiopteridine (0.0795 grams, 0.243 mmoles) was suspended in 5 ml of 2% sodium hydroxide and stirred for 3 hours at room temperature. The mixture was brought to ph 5 by addition of glacial acetic acid, cooled in ice, fitlered, the solid washed with cold water, then dried in an oven at 70° to give 0.0717 grams (104% yield) of yellow solid. An IR spectrum of the product indicated that hydrolysis was incomplete and the yellow solid was predominantly unreacted starting material.

Example X

Hydrolysis of 4-acetamido-2,7-diamino-6-(2-tolylthiopteridine, Method B.

A stirred suspension of 0.0666 grams (0.195 mmoles) of 4-acetamido-2,7-diamino-6-(2-toluenethio) pteridine in 24 ml of 2 percent sodium hydroxide was boiled for 3 hours. The pH of the mixture was adjusted to 8 by the dropwise addition of glacial acetic acid. The mixture was cooled in ice, filtered, the solid washed with water, and dried in an oven at 70° to give 0.0666 grams (100% recovery) of starting material. The product was identified by an IR spectrum.

Example XI

Hydrolysis of 4-acetamido-2,7-diamino-6-phenylthiopteridine, Method C.

4-Acetamido-2-amino-6-phenylthiopteridine (0.0795 grams, 0.243 mmoles) was suspended in 5 ml of 10% sodium hydroxide and boiled gently for 5 minutes. The mixture was allowed to cool, then brought to pH 5–6 by the addition of glacial acetic acid. The mixture was then cooled in ice, filtered, the solid washed with cold water and dried in an oven at 70° to give 0.0705 grams (102% yield) of 2,4,7-triamino-6-phenyl-thiopteridine. The analytical sample was crystallized once from N,N-dimethylformamide-water with 85.8% recovery. Its melting point was above 300°C.

Anal. Calcd for $C_{12}H_{11}N_7S$: C, 50.51; H, 3.89; N, 34.37; S, 11.24. Found: C, 50.29; H, 3.88; N, 34.33; S, 11.15.

Example XII

Hydrolysis of 4-acetamido-2,7-diamino-6-(2-tolylthio)pteridine, Method D.

Figure 3:
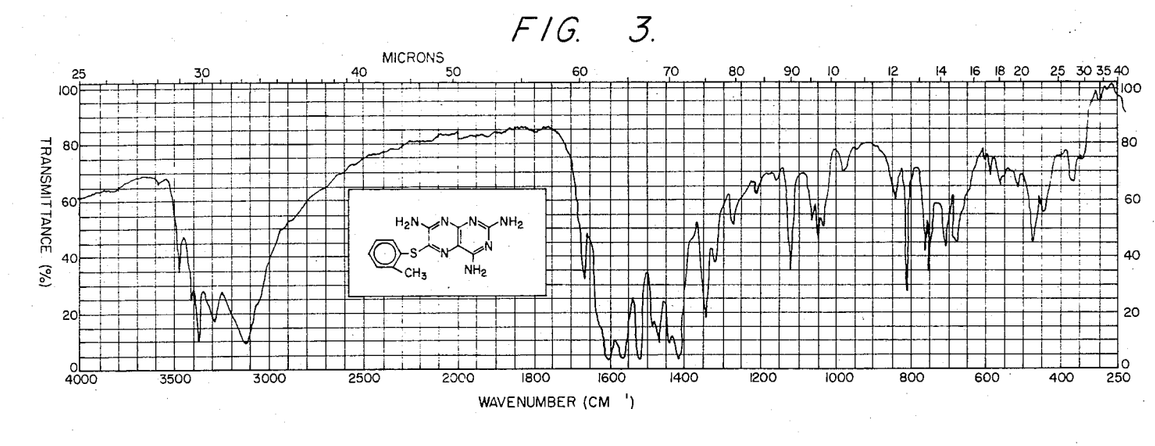
FIG. 3 is for 2,4,7-triamino-6(2-tolylthio)pteridine.

A 0.0666 grams (0.195 mmoles) sample of 4-acetamido-2,7-diamino-6-(2-toluenethio) pteridine was dissolved in 5 ml of N,N-diethylformamide, 5 ml of 10% sodium hydroxide was added and the mixture boiled for 5 minutes. The mixture was cooled and the pH adjusted to 6 by dropwise addition of glacial acetic acid, 10 ml of water was added and the mixture was cooled overnight in ice. The mixture was filtered, the solid washed with water and dried in an oven at 70° to give 0.0377 grams (64.6% yield) of 2,4,7-triamino-6-(2-tolylthio)pteridine. The product was identified by comparison with an authentic sample produced by method C. See IR Curve in FIG. 3.

Example XIII

Hydrolysis of 4-acetamido-2,7-diamino-6-(2-tolylthio)pteridine, Method E.

A stirred suspension of 0.0666 grams (0.195 mmoles) of 4-acetamido-2,7-diamino-6-(2-toluenethio)pteridine in 5 ml of 20% sodium hydroxide was boiled gently for 30 minutes. The mixture was cooled, 5 ml of water was added, and the pH adjusted to six by the dropwise addition of glacial acetic acid. After cooling in ice, the mixture was filtered, the solid washed with water and dried in an oven at 70° to give 0.0590 grams (101% yield) of product. An IR spectrum of the material indicated that the product was mostly 2,4,7-triamino-6-(2-tolylthio)pteridine, but there was also some unreacted starting material.

Example XIV

Hydrolysis of 4-acetamido-2,7-diamino-6-(2-tolylthio)pteridine, Method F.

A stirred suspension of 0.0666 grams (0.195 mmoles) of 4-acetamido-2,7-diamino-6-(2-toluenethio)pteridine in five ml of 33% sodium hydroxide was boiled gently for 30 minutes. The mixture was cooled, 10 ml of water added, and the pH adjusted to six by the dropwise addition of glacial acetic acid. After cooling in ice, the mixture was filtered, the solid washed with water, and dried in an oven at 70° to give 0.0570 grams (97.7% yield) of product. An IR spectrum of the material indicated that the product was mostly 2,4,7-triamino-6-(2-toluenethio)pteridine, but there was still some unreacted starting material.

Example XV

Hydrolysis of 4-acetamido-2,7-diamino-6-phenylthiopteridine, Method G.

A suspension of 1.10 grams (3.36 millimoles) of 4-acetamido-2,7-diamino-6-phenylthiopteridine in 25 ml of concentrated hydrochloric acid was stirred at room temperature for 30 minutes. The material gradually dissolved giving a deep red-orange solution from which a solid began to precipitate after about 7 minutes of stirring. After 30 minutes 25 ml of water were added, the mixture was adjusted to pH 7 by the dropwise addition of concentrated ammonium hydroxide (about 39 ml), and the mixture was cooled in ice. The mixture was filtered, the solid was washed with 10 ml of water, then 10 ml of ethanol, and dried in an oven at 65° to give 0.959 grams (100% yield) of 2,4,7-triamino-6-phenylthiopteridine.

Example XVI

Hydrolysis of 4-acetamido-2,7, diamino-6-(4-tolylthio)pteridine, Method H.

A solution of 1.15 grams (3.38 mmoles) of 4-acetamido-2,7-diamino-6-(4-tolylthio)pteridine in 15 ml of 90% formic acid was heated just to boiling, the heating was discontinued, 10 ml of concentrated hydrochloric acid was added, and the mixture stirred for thirty minutes. The pH of the mixture was adjusted to 7 by the dropwise addition of concentrated ammonium hydroxide (about 60 ml), 25 ml water were added and the mixture cooled in ice. The mixture was filtered, the solid washed with 10 ml of water, then 10 ml of absolute ethanol and dried in an oven at 65° to give 0.951 grams (94.2% yield) of 2,4,7-triamino-6-(4-tolylthio)pteridine. The product was identified by comparison with an authentic sample.

Example XVII

Hydrolysis of 4-acetamido-2,7-diamino-6-phenylthiopteridine, Method I.

A stirred suspension of 1.11 grams (3.40 mmoles) of 4-acetamido-2,7-diamino-6-phenylinthiopteridine in 25 ml of concentrated hydrochloric acid was refluxed for 5 minutes, then cooled and 25 ml of water added. The pH was adjusted to 7 by the dropwise addition of concentrated ammonium hydroxide (about 25 ml). After cooling in ice, the mixture was filtered, the solid washed with 10 ml of water, then 10 ml of ethanol, and dried in an oven at 65°, to give 1.02 grams of yellow solid. The IR spectrum of the product was not the same as an IR spectrum of an authentic sample of 2,4,7-triamino-6-phenylpteridine. The material was crystalized from 80 ml of N,N-dimethylformamide plus 425 ml of water to give 0.490 grams of 2,4,7-triamino-6-phenylthiopteridine which was identical with an authentic sample of the same material. The filtrate from the crystallization was evaporated to dryness under reduced pressure to give 0.570 grams of pale-yellow solid. The IR spectrum was different from that of 2,4,7-triamino-6-phenylthiopteridine. The material was recrystallized from water to give 0.367 grams (64.4% recovery) of bright-yellow solid. The product was soluble in acetic acid, water, and N,N-dimethylformamide; moderately soluble in methanol, slightly soluble in ethanol, and insoluble in butanol.

The following tables set forth data obtained from preparations of the type set forth in the above examples, Examples I through XVII. In Table II there is set forth certain preparation conditions and the results of 97 reactions. The reactions were of the general type illustrated in Table I wherein R has the significance set forth in Tables II, III and IV.

TABLE II

| Reaction Number | R | Preparation Method (see examples) | Quantities of Reactants (mmoles) I | II | III | Reaction Time | % Yield of Acylated Intermediate IV | Reaction Number | Hydrolysis Method (see examples) | Quantities of Reactants (mmoles) | Reaction Time | % Yield of Final Product V | Two-step Overall Yield VI |
|---|---|---|---|---|---|---|---|---|---|---|---|---|---|
| 1 | phenyl- | A | | 1.00 | 0.500 | 3 hr. | 0 | | | | | | |
| 2 | phenyl- | B | | 1.00 | 0.500 | 5 min. | 0 | | | | | | |
| 3 | phenyl- | C | | 1.00 | 0.500 | 5 min. | 20.2 | | | | | | |
| 4 | phenyl- | D | | 1.00 | 0.500 | 1 hr. | | | | | | 68.4 | 68.4 |
| 5 | phenyl- | E | 2.00 | 1.00 | 0.500 | 10 min. | 51.5 | 6 | A | 0.243 | 3 hr. | Inc.[a] | |
| | phenyl- | | | | | | | 7 | C | 0.243 | 5 min. | 100 | 51.5 |
| 8 | phenyl- | F | 2.00 | 1.00 | 0.500 | 12 hr. | | | | | | 70.5 | 70.5 |
| 9 | phenyl- | G | 0.91 | 0.75 | 0.516 | 5 min. | 57.9 | | | | | | |
| 10 | phenyl- | G | 1.18 | 0.76 | 0.507 | 5 min. | 70.0 | | | | | | |
| 11 | phenyl- | G | 1.16 | 1.01 | 0.509 | 5 min. | 71.7 | | | | | | |
| 12 | phenyl- | G | 1.63 | 1.01 | 0.507 | 5 min. | 70.6 | | | | | | |
| 13 | phenyl- | G | 2.5 | 1.00 | 0.506 | 5 min. | 71.3 | | | | | | |
| 14 | phenyl- | G | 10.0 | 10.0 | 5.00 | 5 min. | 68.6 | 15 | I | 3.40 | 5 min. | 50.5 | 34.7 |
| 16 | phenyl- | G | 10.4 | 10.0 | 5.00 | 5 min. | 68.2 | 17 | G | 3.36 | 30 min. | 100 | 68.2 |
| 18 | 4-tolyl- | F | 2.00 | 0.75 | 0.500 | 15 hr. | | | | | | 50.2 | 50.2 |
| 19 | 4-tolyl- | G | 2.21 | 0.74 | 0.520 | 5 min. | 91.5[b] | 20 | C | 0.364 | 15 min. | 67.8 | 62.2 |
| 21 | 4-tolyl- | G | 10.2 | 10.0 | 5.00 | 5 min. | 71.2 | 22 | I | 3.32 | 5 min. | 0 | 0 |
| 23 | 4-tolyl- | G | 10.4 | 10.0 | 5.00 | 5 min. | 67.6 | 24 | G | 3.38 | 30 min. | Inc. | |
| | 4-tolyl- | | | | | | | 25 | H | 3.38 | 30 min. | 94.2 | 63.7 |
| 26 | 4-tolyl- | E | 2.12 | 0.78 | 0.516 | 15 hr. | 43.4[b] | 27 | C | 0.224 | 5 min. | 37.3 | 16.2 |
| 28 | 3-tolyl- | E | 2.03 | 0.74 | 0.521 | 1 hr. | 66.8[b] | 29 | C | 0.347 | 5 min. | Inc. | |
| | 3-tolyl- | | | | | | | 30 | G | 0.347 | 1 hr. | 52.7 | 28.5 |
| 31 | 3-tolyl- | F | 2.00 | 0.75 | 0.500 | 15 hr. | | | | | | 54.9 | 54.9 |
| 32 | 3-tolyl- | G | 10.0 | 10.0 | 5.00 | 5 min. | 72.7 | 33 | I | 3.37 | 5 min. | 97.4 | 70.8 |
| 34 | 2-tolyl- | E | 2.06 | 0.74 | 0.513 | 10 min. | 110[b] | 35 | C | 0.500 | 5 min. | Inc. | |
| | 2-tolyl- | | | | | | | 36 | C | 0.500 | 15 min. | Inc. | |
| | 2-tolyl- | | | | | | | 37 | G | 0.500 | 3 hr. | Inc. | |
| 38 | 2-tolyl- | F | 2.41 | 0.75 | 0.500 | 18 hr. | | | | | | 62.2 | 62.2 |
| 39 | 2-tolyl- | G | 20.6 | 10.0 | 5.00 | 10 min. | 83.6 | 40 | B | 0.195 | 3 hr. | Inc. | |
| | 2-tolyl- | | | | | | | 41 | D | 0.195 | 5 min. | 64.6 | 54.1 |
| | 2-tolyl- | | | | | | | 42 | E | 0.195 | 30 min. | Inc. | |
| | 2-tolyl- | | | | | | | 43 | F | 0.195 | 30 min. | Inc. | |
| | 2-tolyl- | | | | | | | 44 | G | 0.195 | 30 min. | 96.1 | 80.1 |
| | 2-tolyl- | | | | | | | 45 | I | 2.63 | 5 min. | 94.5 | 79.2 |
| 46 | 4-chlorophenyl- | G | 3.24 | 1.01 | 0.513 | 2 min. | 118[b] | 47 | C | 0.513 | 15 min. | 81.0 | 81.0 |

TABLE II
(cont.)

| Reaction Number | R | Preparation Method (see examples) | Quantities of Reactants (mmoles) I | II | III | Reaction Time | %Yield of Acylated Intermediate IV | Reaction Number | Hydrolysis Method (see examples) | Quantities of Reactants (mmoles) | Reaction Time | %Yield of Final Product V | Two-step Overall Yield VI |
|---|---|---|---|---|---|---|---|---|---|---|---|---|---|
| 48 | 4-chlorophenyl- | G | 10.2 | 10.0 | 5.00 | 5 min. | 86.6 | 49 | I | 3.79 | 5 min. | 100 | 86.6 |
| 50 | 4-nitrophenyl- | G | 1.13 | 1.02 | 0.514 | 4 min. | 91.1 | 51 | I | 0.467 | 1 min. | 100 | 91.1 |
| 52 | 4-carboxyphenyl- | G | 1.27 | 1.00 | 0.504 | 3 min. | 67.0 | 53 | C | 0.338 | 5 min. | 90.6 | 60.7 |
| 54 | pentachlorophenyl- | G | 1.44 | 1.06 | 0.534 | 5 min. | 122[b] | 55 | I | 0.534 | 5 min. | 79.1 | 36.8 |
| 56 | pentachlorophenyl- | G | 1.06 | 1.04 | 0.512 | 5 min. | 46.5 | 57 | I | 0.238 | 5 min. | 79.1 | 36.8 |
| 58 | pentafluorophenyl- | G | 2.16 | 1.06 | 0.523 | 5 min. | 66.8 | 59 | G | 0.349 | 15 min. | 91.8 | 61.4 |
| 60 | 2-aminophenyl- | G | 2.38 | 1.02 | 0.517 | 3 min. | 81.4[b] | 61 | G | 0.422 | 30 min. | 52.1 | 42.4 |
| 62 | 2-aminophenyl- | G | 10.2 | 10.0 | 5.00 | 5 min. | 56.8 | 63 | I | 0.234 | 5 min. | 97.8 | 55.6 |
| 64 | 2-aminophenyl- | G | 10.1 | 10.2 | 5.00 | 5 min. | 41.1 | 65 | G | 0.205 | 30 min. | 93.0 | 38.2 |
| 66 | 4-acetamidophenyl- | G | 2.16 | 1.01 | 0.530 | 2 min. | 60.8 | 67 | G | 0.322 | 30 min. | 100 | 60.8 |
| 68 | 4-t-butylphenyl- | G | 2.18 | 1.00 | 0.545 | 15 min. | 61.7 | 69 | G | 0.337 | 1 hr. | Inc. | |
| | 4-t-butylphenyl- | | | | | | | 70 | I[c] | 0.337 | 1 hr. | 85.7 | 53.9 |
| 71 | 4-t-butyl phenyl- | G | 1.00 | 1.00 | 5.00 | 5 min. | 70.0 | 72 | I | 0.350 | 5 min. | 0 | |
| 73 | 4-t-butyl phenyl- | G | 1.03 | 1.02 | 5.00 | 5 min. | 68.4 | 74 | G | 0.339 | 3 hr. | Inc | |
| | 4-t-butylphenyl- | | | | | | | 75 | H | 0.309 | 15 min. | 101 | 68.4 |
| 76 | benzyl- | F | 2.39 | 0.75 | 0.500 | 18 hr. | 60.3 | | | | | | 60.3 |
| 77 | benzyl- | G | 2.44 | 0.79 | 0.517 | 10 min. | 95.0 | 78 | C | 0.492 | 5 min. | Inc | |
| | benzyl- | | | | | | | 79 | G | 0.492 | 1 hr. | 69.3 | 65.7 |
| 80 | benzyl- | G | 10.1 | 10.0 | 5.00 | 5 min. | 80.4 | 81 | I | 0.389 | 5 min. | 92.4 | 74.2 |
| 82 | 2-phenylethyl- | G | 2.15 | 1.05 | 0.539 | 15 min. | 69.1 | 83 | G | 0.372 | 1 hr. | 97.4 | 67.4 |
| 84 | 2-phenylethyl- | G | 10.1 | 10.0 | 5.00 | 5 min. | 70.4 | 85 | I | 0.310 | 5 min. | 94.4 | 66.4 |
| 86 | 1-phenylethyl- | H | 2.24 | 1.02 | 0.536 | 30 min. | 51.5 | 87 | G | 0.276 | 15 min. | 87.0 | 44.3 |
| 88 | 2-propenyl | G | 2.25 | 1.03 | 0.533 | 15 min. | 57.4 | 89 | G | 0.306 | 15 min. | 105 | 57.4 |
| 90 | n-hexyl- | G | 207 | 1.04 | 0.519 | 15 min. | 55.5 | 91 | G | 0.288 | 30 min. | 93.7 | 52.0 |
| 92 | n-hexyl- | G | 10.0 | 10.0 | 5.04 | 15 min. | 73.4 | | | | | | |

TABLE II
(cont.)

| Reaction Number | R | Preparation Method (see examples) | Quantities of Reactants (mmoles) | | | Reaction Time | %Yield of Acylated Intermediate | Reaction Number | Hydrolysis Method (see examples) | Quantities of Reactants (mmoles) | Reaction Time | %Yield of Final Product | Two-step Overall % Yield |
|---|---|---|---|---|---|---|---|---|---|---|---|---|---|
| | | | I | II | III | | IV | | | | | V | VI |
| 93 | 1-adamantyl- | H | 1.03 | 1.01 | 0.507 | 10 min. | 76.7 | 94 | G | 0.397 | 3 hrs. | 87.9 | 67.4 |
| 95 | 2,3-dihydroxy-1-propyl- | H | 1.90 | 1.01 | 0.514 | 10 min. | 100[d] | 96 | I[c] | 0.514 | 1 min. | 89.0 | 89.0 |
| 97 | 2-benzothiozyl | G | 1.03 | 1.02 | 0.512 | 10 min. | 0 | | | | | | |

[a] Hydrolysis of the acylated intermediate was incomplete.

[b] The percentage yield reported is for a crude product which is contaminated with potassium chloride.

[c] The mixture was heated to 80–85° but was not refluxed.

TABLE III

THE RECRYSTALLIZATION SOLVENTS, PERCENTAGE RECOVERY ON RECRYSTALLIZATION, MELTING POINTS AND ANALYTICAL DATA FOR SELECTED 2,4,6-TRIAMINO-6-THIOPTERIDINES

| R | Recryst Solvent[a] | % Recovery | MP | Analytical Data Calcd Found | | | |
|---|---|---|---|---|---|---|---|
| | | | | C | H | N | S |
| phenyl- | DMF + H₂O 1 : 2 | 86 | >350° | 50.51 5-.29 | 3.89 3.88 | 34.37 34.33 | 11.24 11.15 |
| 2-tolyl- | DMF + H₂O 1 : 3 | 86 | 337–342° dec[c] | 52.16 51.88 | 4.38 4.24 | 32.76 33.01 | 10.71 10.87[d] |
| 3-tolyl- | DMF + H₂O 1 : 5 | 84 | 329–330° | 52.16 51.91 | 4.38 4.32 | 32.76 32.72 | 10.71 11.05[d] |
| 4-tolyl- | DMF + H₂O 1 : 2 | 92 | >350° | | | 32.76 33.01 | |
| t-butylphenyl- | DMF + H₂O 1 : 0.75 | 91 | >350° | 56.29 56.01 | 5.61 5.80 | 28.72 28.84 | 9.37 9.35[d] |
| 2-aminophenyl- | DMF | 73 | 304–307° | 48.00 48.07 | 4.03 3.86 | 37.32 37.32 | 10.66 10.46 |
| 4-chlorophenyl- | DMF + H₂O 1 : 2 | 91 | 350° | | | 30.66 30.81 | |
| pentafluorophenyl- | DMF + H₂O 1 : 1 | 97 | 300–305° | 38.40 38.44 | 1.61 1.57 | 26.13 26.33 | 8.54 8.46 |
| benzyl- | DMF + H₂O 1 : 7.5 | 85 | 293–296° | 52.16 51.96 | 4.38 4.30 | 32.76 32.76 | 10.71 10.88 |
| 1-phenylethyl | DMF + H₂O 1 : 2.5 | 77 | 286–295° dec | 53.65 53.18 | 4.82 4.69 | 31.29 31.29 | 10.23 10.84[d] |
| 2-phenylethyl | DMF + H₂O 1 : 1.5 | 93 | 302–304° | 53.65 53.39 | 4.83 4.77 | 31.29 31.52 | 10.23 10.32[d] |
| n-hexyl- | DMF + H₂O 1 : 0.33 | 73 | 295–300° dec | 49.12 49.17 | 6.53 6.79 | 33.42 33.60 | 10.93 11.06 |

[a] The pteridine was dissolved in the minimum amount of hot DMF, then hot water was carefully added until the ratio indicated was reached.
[b] All melting points were determined on a Kofler micro hot stage. All those compounds which melted, melted with decomposition.
[c] Decomposed without melting.
[d] By difference.

TABLE IV

THE PAPER CHROMATOGRAPHY, Rf VALUES AND UV DATA FOR SELECTED 2,4,7-TRIAMINO-6-THIOPTERIDINES

| R | Paper Chromatography[a] Rf Values | | | UV Data |
|---|---|---|---|---|
| | A | B | D | λ max (ε max) |
| phenyl- | 0.54 | 0.69 | 0.52 | 214 (39,400)[b] |
| | | | | 247 (21,100) |
| | | | | s284 ( 8,500) |
| | | | | 369 |
| 4-tolyl- | 0.57 | 0.72 | 0.58 | 214 (38,600)[b] |
| | | | | 248 (21,700) |
| | | | | s284 ( 8,530) |
| | | | | 369 (17,850) |
| 3-tolyl- | 0.60 | 0.74 | 0.60 | 212 (37,100)[b] |
| | | | | 249 (18,420) |
| | | | | 284 ( 8,460) |
| | | | | 369 (17,470) |
| 2-tolyl- | 0.61 | 0.72 | 0.66 | 214 (33,900)[b] |
| | | | | 249 (19,570) |
| | | | | s284 ( 8,960) |
| | | | | 368 (16,430) |
| t-butylphenyl | 0.52 | 0.75 | 0.52 | s260 (18,750)[c] |
| | | | | s283 ( 8,700) |
| | | | | 367 (17,200) |
| 2-aminophenyl | 0.72 | 0.63 | 0.76 | 212 (35,300)[b] |
| | | | | 249 (17,230) |
| | | | | s282 ( 8,100) |
| | | | | 365 (17,520) |
| 4-chlorophenyl- | 0.46 | 0.62 | 0.52 | 214 (36,400)[b] |
| | | | | 249 (20,900) |
| | | | | s284 ( 8,840) |
| | | | | 368 (17,590) |
| 2,3,4,5,6-pentafluro-phenyl | 0.72 | 0.78 | 0.72 | 214 (33,500) |
| | | | | 259 (15,200) |
| | | | | s285 ( 7,950) |
| | | | | 365 (17,250) |
| benzyl- | 0.55 | 0.66 | 0.55 | s241 (30,200)[c] |
| | | | | 289 ( 7,800) |
| | | | | 369 (17,770) |
| 1-phenylethyl | 0.57 | — | 0.48 | 212 (40,400)[b] |
| | | | | 248 (15,710) |
| | | | | s283 ( 7,170) |
| | | | | 363 (13,730) |
| 2-phenylethyl | 0.47 | 0.63 | 0.51 | 290 ( 7,130)[c] |
| | | | | 370 (17,080) |
| n-hexyl | 0.40 | 0.72 | 0.56 | 290 ( 7,620)[c] |
| | | | | 369 (18,150) |

[a]Paper chromatography solvent system: (A) 90% formic acid-water (1:4), (B) pyridine-water (1:4), (D) Trifluroacetic acid-water (1:4).
[b]Solution in 0.1N perchloric acid prepared by dissolving the sample in 0.86 ml of 70% perchloric acid and diluting with water.
[c]Solution in 4.5% formic acid prepared by dissolving the sample in 5.0 ml of 90% formic acid then diluting with water.

EXAMPLE XVIII

Preparation of 4-acetamido-2-amino-7-phenyl-6-phenylthiopteridine.

Figure 5:
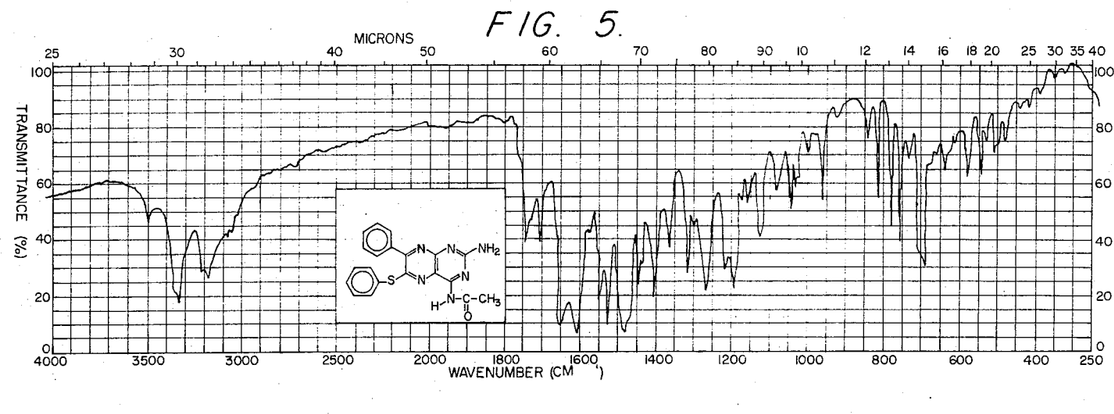
FIG. 5 is for 4-acetamido-2-amino-7-phenyl-6-phenylthiopteridine.

A solution of 0.132 grams (1.20 mmoles) of thiophenol in 20 ml of absolute ethanol was added to a mixture of 0.117 grams (0.489 mmoles) of 2-amino-4,6-diacetamido-5-nitrosopyrimidine, 0.276 grams (0.993 mmoles) of phenacylpyridinium bromide, and 0.122 grams (1.24 mmoles) of potassium acetate and the mixture stirred and refluxed on a preheated hot plate for 5 minutes. The solvent was removed under reduced pressure and the residue treated first with 10 ml of water then with a mixture of 5 ml ether plus 2.5 ml ethanol, cooled in ice, and filtered. After drying in an oven at 65°, 0.0650 grams (33.7% yield) of product was obtained. The analytical sample was crystallized from absolute ethanol with 67.7% recovery. See IR Curve in FIG. 5.

Anal. Calcd for $C_{20}H_{16}ON_6S$: C, 61.85; H, 4.15. Found: C, 61.96; H, 4.07.

Example XVIX

Preparation of 4-acetamido-2-amino-7-methyl-6-phenylthiopteridine.

A solution of 0.128 grams (1.17 mmoles) of thiophenol in 20 ml of absolute ethanol was added to a mixture of 0.122 grams (0.513 mmoles) of 2-amino-4, 6-diacetamido-5-nitrosopyrimidine, 0.174 grams (1.02 mmoles) of acetonylpyridinium chloride, and 0.107 grams (1.09 mmoles) of potassium acetate and the mixture stirred and refluxed on a preheated hot plate for 5 minutes. The solvent was removed under reduced pressure and the residue treated first with 10 ml of water then with 5 ml of ether plus 2 ml of ethanol, cooled to −20°, and filtered. Drying the solid in an oven at 65° gave 0.333 grams (19.8% yield) of product. The analytical sample was crystallized from absolute ethanol with 49.7% recovery.

Figure 6:
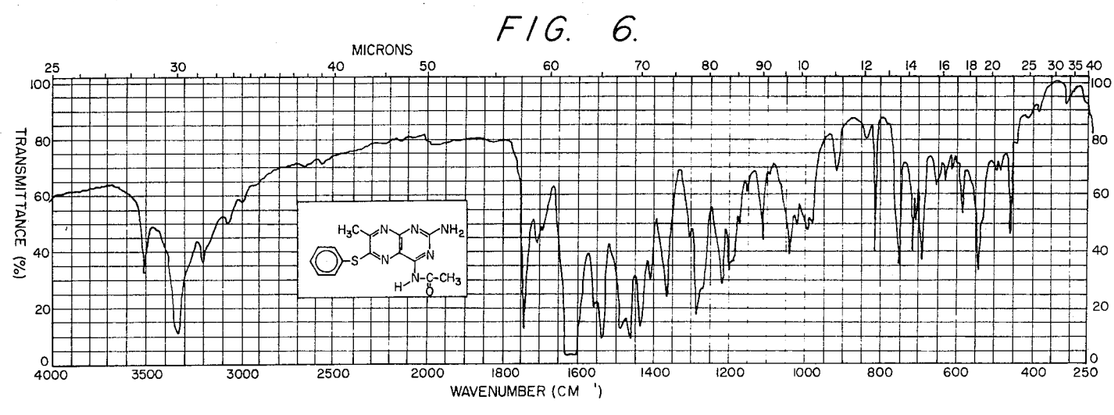
FIG. 6 is for 4-acetamido-2-amino-7-methyl-6-phenylthiopteridine.

Anal. Calcd for $C_{15}H_{14}ON_6S$: C, 55.21; H, 4.32. Found: C, 55.20; H, 4.09. See IR Curve in FIG. 6.

Example XX

Preparation of 4-acetamido-2-amino-7-t-butyl-6-phenylthiopteridine.

A solution of 0.114 grams (1.04 mmoles) of thiophenol in 20 ml of absolute ethanol was added to a mixture of 0.122 grams (0.511 mmoles) of 2-amino-4,6-diacetamido-5-nitrosopyrimidine, 0.260 grams (1.01 mmoles) of 1-(3,3-dimethyl-2-oxo-1-butyl) pyridinium bromide, and 0.115 grams (1.17 mmoles) of potassium acetate and the mixture stirred and refluxed for 10 minutes. The solvent was removed under reduced pressure and the residue pulverized first with 10 ml of ether, filtered, then pulverized again with 10 ml of water, filtered, and dried in an oven at 65° to give 0.0480 grams (25.6% yield) of product. The analytical sample was crystallized from absolute ethanol with 57.8% recovery.

Anal. Calcd for $C_{18}H_{20}ON_6S$: C, 58.68; H, 5.47. Found: C, 58.70; H, 5.34.

Example XXI

Preparation of 4-acetamido-2-amino-6-phenylthio-7(8H)-pteridinone.

Figure 7:
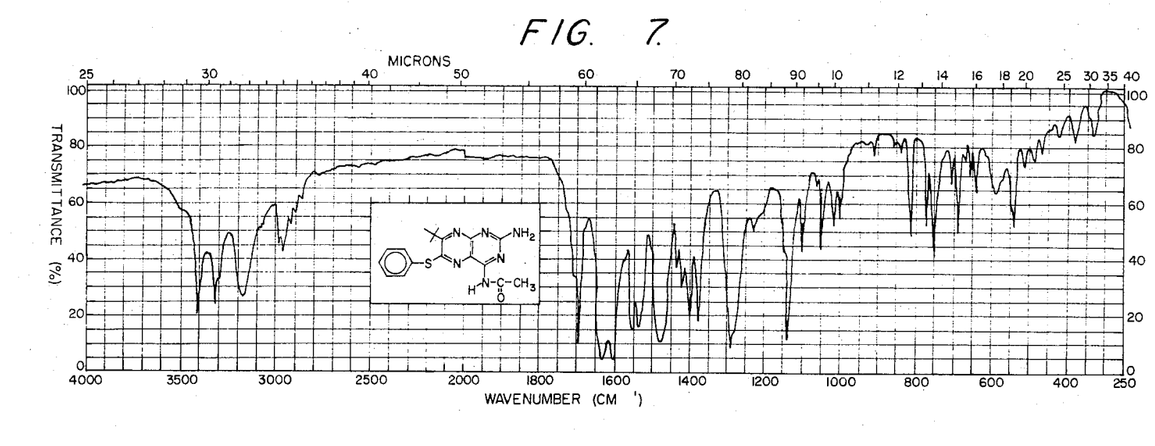
FIG. 7 is for 4-acetamido-2-amino-7-t-butyl-6-phenylthiopteridine.

A solution of 0.138 grams (1.25 mmoles of thiophenol in 20 ml of absolute ethanol was added to a mixture of 0.124 grams (5.19 mmoles) of 2-amino-4,6-diacetamido-5-nitrosopyrimidine, 0.210 grams (1.04 mmoles) 1-(carbethoxymethyl) pyridinium chloride, and 0.130 grams (1.32 mmoles) of potassium acetate. The mixture was stirred and refluxed for 5 minutes then cooled in ice, filtered, the solid washed with a mixture of 2 ml ether plus 4 ml alcohol, then washed with 10 ml of water in small portions, and finally with 1 ml of ethanol. The produce was dried in an oven at 65° to give 0.0952 grams (55.8% yield) of pale-yellow solid. See IR Curve in FIG. 7.

Example XXII

Hydrolysis of 4-acetamido-2-amino-6-phenylthio-7(8H)-pteridinone.

Figure 8:
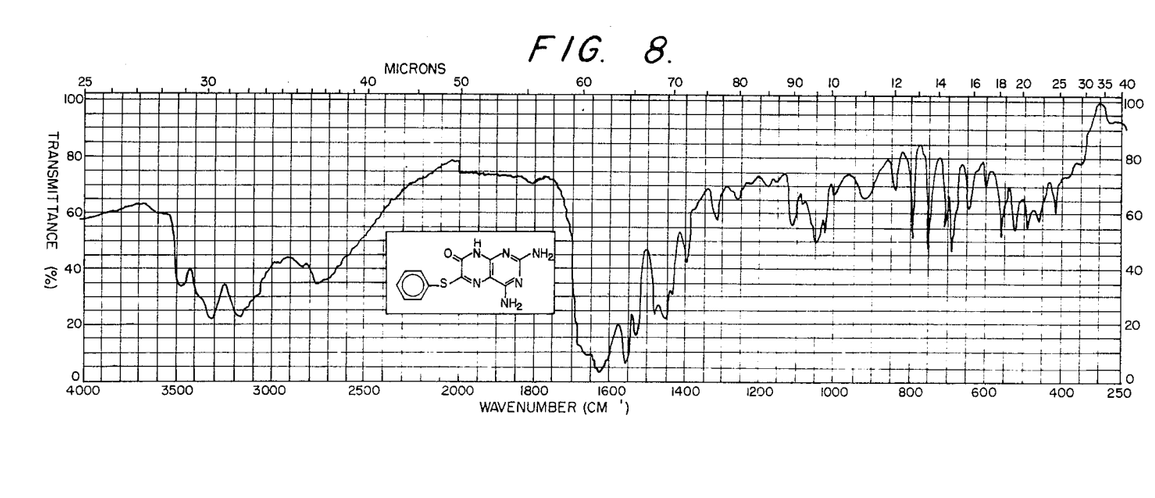
FIG. 8 is for 2,4-diamino-6-phenylthio-7(8H)pteridinone.

A solution of 0.0950 grams (0.298 mmoles) of 4-acetamido-2-amino-6-phenylthio-7(8H)pteridinone in a mixture of 5 ml 90% formic acid and 5 ml of concd hydrochloric acid was heated to boiling for 1 minute. After cooling slightly, 10 ml of water was added and the pH of the mixture was adjusted to 7 by the dropwise addition of concd ammonium hydroxide. The mixture was cooled in ice, filtered, the solid washed well with water, then a little ethanol and dried in an oven at 65° to give 0.0792 grams (95.7% yield, 53.4% yield two-step overall) of pale-yellow product. The analytical sample was crystallized from glacial acetic acid. See IR Curve in FIG. 8.

Anal. Calcd for $C_{12}H_{10}ON_6S$: N, 29.36. Found: N, 29.21.

Example XXIII

Preparation of 4,7-diamino-2-methyl-6-phenylthiopteridine.

A solution of 0.116 g (1.06 mmoles) of thiophenol in 20 ml of absolute ethanol was added to a mixture of 0.0863 g (0.564 mmoles of 4,6-diamino-2-methyl-5-nitrosopyrimidine, 0.160 g (0.04 mmoles) of 1-(cyanomethyl)pyridinium chloride, and 0.113 g (1.15 mmoles) of potassium acetate combined in a flask. The mixture was stirred and heated to reflux on a preheated hot plate. After refluxing for 5 minutes, the mixture was cooled in ice, filtered, the solid washed with a little ethanol, a little water and finally a little more ethanol and dried in an oven at 70° to give 0.134 g (185.1% yield) of off-white product. Paper chromatography of this product by the descending method using Whatman No. 1 paper and visualizing with ultraviolet light at 3,660 A gave the following results: (solvent system, Rf valve, and color of fluorescence); 90% formic acid-water, 1:4, 0.73, yellow-green; pyridine-water 1:4, 0.76, blue-white. The product was recrystallized from dimethylformamide-water 1:1 with 78% recovery. Elemental analysis of the analytical sample for sulfur and nitrogen was positive. UV max (0.1N HC10$_4$) S 378 nm ($\epsilon$12,640), 366 nm ($\epsilon$14,570), 301 nm ($\epsilon$5,790), 291 nm ($\epsilon$6,100), 258 nm ($\epsilon$17,580), 229 nm ($\epsilon$19,730); fluorescence max (1N HC10$_4$) excit 336 nm, emit 421 nm (0.1 N HC10$_4$) excit 344 nm, emmit 408 nm (5% hexamethylphosphoric acid triamide) excit 330 nm, emit 420 nm. Found C, 54.87; H, 4.14; N, 29.86.

Anal. Calcd for $C_{13}H_{12}N_6S$: C, 54.92; H, 4.26; N, 29.57.

Example XXIV

Preparation of 4,7-diamino-2-phenyl-6-phenylthiopteridine.

A solution of 0.13g (1.03 mmoles) of thiophenol in 20 ml of absolute ethanol was added to a mixture of 0.117 g (0.543 mmoles) of 4,6-diamino-2-phenyl-5-nitrosopyrimidine, 0.170 g (1.10 mmoles) of 1-(cyanomethyl) pyridinium chloride, and 0.101g (1.03 mmoles) of potassium acetate combined in a flask. The mixture was stirred and heated to reflux on a preheated hot plate. After refluxing for 5 minutes the mixture was cooled in ice, filtered, the solid washed with a small quantity of ethanol, a small quantity of water and finally with a little more ethanol and dried in an oven at 70° to give 0.124g (66.1% yield) of light brown solid. Paper chromatography of this product by the descending method using Whatman No. 1 paper and visualizing with ultraviolet light at 3,660 A gave the following results: (solvent system, Rf valve, and color of fluorescence); 90% Formic Acid-water 1:4, 0.52, green white; pyridine-water 1:4, 0.70, blue. The product was recrystallized from dimethylformamide-water 2:1 with 95% recovery. Elemental analysis of the analytical sample was positive for sulfur and nitrogen. uv max (4.5% Formic acid) 378 nm ($\epsilon$17,400), 266 nm ($\epsilon$24,000); fluorescence max (45% Formic acid) excit 335 nm, emit 445 nm (4.5% Formic acid) excit 340 nm, emit 438 nm.

Anal. Calcd for $C_{18}H_{14}N_6S$: C, 62.42; H, 4.07; N, 24.27. Found C, 62.29; H, 4.20; N, 24.51.

In the above examples the pyrimidine reactant preferably utilized is a nitrosopyrimidine having acetamido or amino groups in the 4 and 6 position. Although the reaction proceeds effectively with an amino group in the 4 and 6 position it has been found preferably, especially with mild solvents such as alcohols and the like and mild reaction conditions, to have an acetamido group in the 4 position. Preferred reactants are, therefore, 4-acetamido-5-nitrosopyrimidines in which the 6 position is occupied by either an amino or acetamido group, including, of course, substituted amino and acetamido groups. The 2 position may be occupied by any of the groups set forth in Formula 1 for $R^2$.

Utilization of 4-amino-5-nitrosopyrimidines as a reactant in the process of this invention is accomplished preferably under more rigorous conditions than the reaction involving 4-acetamido-5-nitropyrimidines. The reaction of 4-amino-5-nitroso-pyrimidines proceeds effectively in solvents such as N,N-dimethylformamide (DMF), dimethylsulfoxide (DMSO), hexamethylphosphoric acid triamide (HMPA) and the like, especially in the presence of more reactive catalysts such as sodium methoxide. Typical 4-amino-5-nitrosopyrimidines useful in this invention include 2-methyl-4, 6-diamino-5-nitrosopyrimidine, 2-phenyl-4, 6-diamino-5-nitrosopyrimidine, 1,3-dimethyl-6-amino-5-nitrosouracil and the like.

The process of this invention is particularly advantageous for the preparation of novel 6-thiosubstituted pteridines. The reaction proceeds rapidly under mild reaction conditions to produce products of unambiguous orientation in high yields. The reaction is versatile inasmuch as all three of the starting materials may be utilized with various pendant groups to provide a multitude of novel products. The reaction proceeds in a single step to produce products generally having different solubility characteristics than the reactants, therefore facilating separation of the desired product from the reaction mixture.

The process of this invention is further advantageous in its use of readily available, easily prepared, starting materials. Although some novel 6-thiosubstituted pteridines result from utilization of other processes such as the processes set forth hereinabove in Examples I through IV, the efficiency and unavailability of appropriate starting materials militates against the use of such processes.

The processes set forth hereinabove in Examples I through IV depends upon the reaction of a thiosubstituted aldehyde, ketone, nitrile, ester, acid, acid chloride or amide with an appropriate 5-nitrosopyrimidine compound. The thiosubstituted aldehyde, ketone and other reactive compounds have generally not been synthesized and are generally non-existent in nature.

Reactions of ordinary aldehydes, nitriles, esters and the like with reactive 5-nitrosopyrimidines such as 2-amino-4,6-diacetamido-5-nitrosopyrimidine or 4-amino-5-nitrosopyrimidine to form a pteridine compound are known to be effective; Timmis, Nature, 164, 139 (1949). Such reactions involve aryl or alkyl aldehydes, ketones, nitriles or the like to form pteridines having an alkyl or aryl group in the 6 position. Although alkyl or aryl aldehydes, ketones and the like can be readily obtained, the preparation of thiosubstituted aldehydes, ketones and the like has not been conducted.

The synthesis of pteridine compounds by closure of a pyrimidine ring has generally been considered to involve three steps:
1. preparation of a 4-hydroxy or 2,4-hydroxypteridine by a conventional method;
2. cleavage of the pyrimidine ring of the hydroxypteridine;
3. reconstitution of the pteridine nucleus on a pyrazine ring to give the desired product.

This analysis is given at Page 45 of "Heterocyclic Compounds," Robert Elderfield, John Wiley & Sons. (1967).

It is further noted there that the requisite pyrazine may require a multi-step synthesis.

The process of this invention, however, utilizes readily obtainable reactants to form 6-thiosubstituted pteridines which would be difficult to produce through use of the pyrazine process.

The novel process of this invention departs from previously used techniques for synthesizing pteridines. The novel process produces novel 6-thiosubstituted pteridines in a straight-forward manner with substantially no undesirable production of isomers, analogs and other product impurities. The products are readily obtained and purified and are of a definite orientation.

The novel 6-thiosubstituted compounds of this invention are useful as relatively non-toxic folic acid antagonists and as growth retardants in biological processes. The products can be administered in effective quantities by known techniques. A known folic acid antagonist, triampterene, has a maximum tolerated dose of 160 mg/kg body weight in mice whereas the following compounds having comparable antagonistic properties were found non-toxic to mice at dosages of at least 640 mg/kg of body weight:

2,4,7-triamino-6-phenylthiopteridine
2,4,7-triamino-6-(p-t-butylphenylthio)pteridine
2,4,7-triamino-6-(O-tolylthio)pteridine
2,4,7-triamino-6-(m-tolylthio)pteridine
2,4,7-triamino-6-(2-aminophenylthio)pteridine
2,4,7-triamino-6-benzylthiopteridine
2,4,7-triamino-6-(2-phenylethylthio)pteridine These products are also useful as opacifiers and as UV screening materials (see Table IV for effective wavelengths) and are also suitable as pigments for the preparation of fluorescent paints, and as fluorescing agents for the preparation of fluorescent solutions. (See Table V for wavelengths of fluorescence.) These compopunds are useful as components in scintillation fluids. For example, the addition of 0.010 of 2,4,7-triamino-6-(4-chlorophenylthio)pteridine to a scintillation fluid composed of 6.0 grams naphthalene, 10 ml methanol, 2 ml ethylene glycol and 85 ml dioxane increased the efficiency from 3% to 5% for counting $C^{14}$ samples. The addition of 0.0010 g of 2,4,7-triamino-6-phenylthiopteridine increased the efficiency from 3% to 6% for counting $C^{14}$ samples. These compounds are also useful as fluorescence quenchers. For example when 0.010 g of 4,7-diamino-2-methyl-6-phenylthiopteridine is added to the above described scintillation fluid fluorescence is 98% quenched under $C^{14}$ excitation. 0.010g of 2,4,7-triamino-6-(2-phenylethylthio)pteridine similarity gives 91% quenching of fluorescence.

The following table provides excitation and emission wavelengths for various 2,4,7-triamino-6-thiopteridines.

TABLE V

EXCITATION AND EMISSION WAVELENGTHS FOR 2,4,7-TRIAMINO-6-THIOPTERIDINES $$H_2N-\underset{R-S-}{\underset{|}{\bigg\langle}}\overset{N}{\underset{N}{\bigg\rangle}}\overset{N}{\underset{NH_2}{\bigg\langle}}-NH_2$$

| R | 1 N HC10 Exc. | 1 N HC10 Emis. | 0.1N HC10 Exc. | 0.1N HC10 Emis. | 45% HCOOH Exc. | 45% HCOOH Emis. | 4.5% HCOOH Exc. | 4.5% HCOOH Emis. | 5% DMF Exc. | 5% DMF Emis. |
|---|---|---|---|---|---|---|---|---|---|---|
| phenyl- | 352 | 448 | 356 | 443 | | | | | | |
| 4-tolyl- | 354 | 440 | 355 | 448 | | | | | 362 | 430 |
| 3-tolyl- | 340 | 443 | 356 | 414 | | | | | 360 | 430 |
| 2-tolyl | 354 | 439 | 360 | 413 | | | 358 | 413 | 359 | 430 |
| 4-t-butyphenyl | 355 | 441 | 356 | 405 | 339 | 440 | 347 | 391 | | |
| 2-Aminophenyl- | 359 | 496 | 355 | 480 | | | 357 | 483 | 363 | 438 |
| 4-Chlorophenyl- | 356 | 401 | 356 | 441 | | | 357 | 407 | 358 | 424 |
| 2,3,4,5,6-penta-Flurophenyl- | 367 | 442 | 367 | 439 | | | | | 380 | 440 |
| Benzyl- | 360 | 436 | 356 | 403 | 365 | 445 | 343 | 385 | 366 | 426 |
| 1-Phenylethyl- | 378 | 500 | 359 | 408 | | | | | 372 | 438 |
| 2-Phenylethyl- | 368 | 82 | 371 | 476 | 394 | 493 | 366 | 440 | 385 | 445 |
| n-Hexyl | 358 | 440 | 356 | 409 | 364 | 481 | 370 | 440 | 380 | 443 |

Although the instant invention has been described hereinabove by reference to specific examples, it is not intended to be limited thereto, but to include all the modifications and variations falling within the scope of the appended claims.

We claim:
1. A thiopteridine of the structure wherein R'' and R''' are members selected from the class consisting of amino and acetamido and R is a member selected from the group consisting of lower alkyl, phenyl and a substituted phenyl wherein the substituted group is lower alkyl or halogen.

2. A process for producing 2, 4, substituted thiopteridines comprising the steps of reacting:
   a. a thiol selected from the class consisting of alkyl and aryl thiols having less than ten carbon atoms,
   b. a 2-substituted -4,6-diacetamido-5-nitropyrimidine, wherein the substituent in the 2 position is selected from the group consisting of amino, lower alkyl amino phenylamino, acetamido, hydroxy, lower alkoxy, phenoxy, thio, lower alkyl thio, phenylthio, lower alkyl, phenyl or hydrogen and
   c. a quaternary pyridinium halide selected from the class consisting of wherein R is a lower alkyl phenyl, a substituted phenyl wherein the substituted group is lower alkyl or halogen or alkoxy having less than 6 carbon atoms and y is a halogen.

3. The thiopteridine of claim 2 wherein R is phenyl.
4. The thiopteridine of claim 2 wherein R is methyl.
5. The thiopteridine of claim 2 wherein R is t-butyl.
6. A process for producing 2, 4, substituted-6-thiopteridines comprising the steps of reacting in the presence of a solvent for said reactants and an alkali metal base.
   a. a thiol selected from the class consisting of alkyl and aryl thiols having less than ten carbon atoms,
   a 2,4,6-substituted-5nitrosopyrimidine wherein the substituent in the 4 position is selected from the class consisting of amino and acetamido and wherein the substituents in the 2 and 6 positions are selected from the group consisting of amino, lower alkyl amino, phenylamino, acetamide, hydroxy, lower alkoxy, phenoxy, thio, lower alkyl thio, phenylthio, lower alkyl, phenyl or hydrogen, and
   c. a quaternary pyridinium compound selected from the class consisting of pyridinium-activated aldehydes, ketones, nitriles, acids, amides and esters, said compound having a reactive methylene group adjacent to the functional group.

7. The process of claim 6 wherein the thiol is an alkyl or aryl thiol having less than 10 carbon atoms.

8. The process of claim 6 wherein the 2,4,6-substituted-5-nitrosopyrimidine compound is a 2-substituted-4,6-diacetamido-5-nitrosopyrimidine wherein the substituent in the 2 position is selected from the group consisting of amino, lower alkyl amino, phenylamino, acetamido, hydroxy, lower alkoxy, phenoxy, thio, lower alkyl thio, phenylthio, lower alkyl, phenyl or hydrogen.

9. The process of claim 8 wherein the 5-nitrosopyrimidine is 2-amino-4,6-diacetamido-5-nitrosopyrimidine.

10. The process of claim 9 wherein the 5-nitrosopyrimidine is 2,4,6-triamino-5-nitrosopyrimidine.

11. The process of claim 6 wherein the quaternary compound is 1-(cyanomethyl) pyridinium halide.

12. The process of claim 6 wherein the quaternary pyridinium compound is 1-(carboxy alkyl) pyridinium halide wherein the alkyl group has less than about 10 carbon atoms.

13. The 6-thiosubstituted pteridine of claim 1 wherein R'' is acetamido.

14. The 6-thiosubstituted pteridine of claim 1 wherein R'' is amino.

15. The 6-thiosubstituted pteridine of claim 1 wherein R is phenyl.

16. The 6-thiosubstituted pteridine of claim 1 wherein R'' is amino.

* * * * *